UNITED STATES PATENT OFFICE.

WILLIAM M. FORCE, OF NEWARK, NEW JERSEY.

IMPROVEMENT IN PROCESSES OF MAKING OIL FROM COTTON-SEED.

Specification forming part of Letters Patent No. 130,573, dated August 20, 1872.

*To all whom it may concern:*

Be it known that I, WILLIAM M. FORCE, of Newark, in the county of Essex and State of New Jersey, have invented an Improvement in the Process of Making Oil from Cotton-Seeds; and the following is declared to be a correct description of the same:

Oil has been made from cotton-seed by first hulling the seed, and then heating the decorticated seed or meal in a suitable vessel and stirring the same. After this the oil is expressed in the same manner as usual in the manufacture of linseed-oil, and there is an oil-cake remaining after the oil has been expelled. If the cotton-seed meal is barreled or shipped in bulk in the condition adapted to the manufacture of oil—that is to say, after hulling and heating—it is very liable to ferment and become injured. If the heating operation is continued, either in a closed vessel or when exposed to the atmosphere, the quality of the oil is injured, and it is not as well adapted to the subsequent refining operations, as the color often is dark or the yield inferior in consequence of the oil being changed or rendered glutinous by the excess of heat.

I avoid all these difficulties by my process, which is as follows: The seed is first hulled in any usual manner, then the decorticated seed or meal is exposed to the action of artificial currents of warm dry air. The temperature is such as not to scorch or injure the meal, but only to remove the watery portions of the same. A convenient apparatus for thus dehydrating the meal is represented in the patent of L. S. Chichester, No. 83,255.

The condition of the cotton-seed after this treatment is such that it can be kept without risk of injury, or transported to any desirable market where the oil can be most conveniently expressed.

If the cotton-seed meal was simply pressed after the aforesaid drying operation the yield of oil would be small. I therefore moisten the meal with water and subject the same to a mulling operation, and warm the mass previous to pressing, and thus the necessary aqueous matter is restored before the oil is expressed; hence the meal is brought to a condition similar to that of the heated seed, in the usual mode of manufacture, directly after hulling.

I do not claim the drying of hulled cotton-seed, so as to prepare it for transportation, as that was in use before my invention.

I claim as my invention—

1. The method herein specified of preparing hulled cotton-seed meal for storage or shipment by exposing the same to the action of warm dry currents of air, as set forth.

2. The method herein set forth of preparing dry cotton-seed meal for expressing the oil by adding moisture to the same and warming it, as set forth.

Signed by me this 9th day of December, 1871.

WM. M. FORCE.

Witnesses:
GEO. T. PINCKNEY,
CHAS. H. SMITH.